Jan. 4, 1972   C. L. SEEFLUTH   3,632,713
BLOW MOLDING ORIENTED ARTICLES USING ELONGATED OVAL PLUG
Filed Nov. 26, 1969   2 Sheets-Sheet 1

INVENTOR.
C. L. SEEFLUTH
BY
Young + Quigg
ATTORNEYS

Jan. 4, 1972 C. L. SEEFLUTH 3,632,713

BLOW MOLDING ORIENTED ARTICLES USING ELONGATED OVAL PLUG

Filed Nov. 26, 1969 2 Sheets-Sheet 2

INVENTOR.
C. L. SEEFLUTH

BY

*Young & Quigg*

ATTORNEYS

United States Patent Office 3,632,713
Patented Jan. 4, 1972

3,632,713
BLOW MOLDING ORIENTED ARTICLES USING ELONGATED OVAL PLUG
Charles L. Seefluth, Bartlesville, Okla., assignor to Phillips Petroleum Company
Filed Nov. 26, 1969, Ser. No. 879,993
Int. Cl. B29c 17/07
U.S. Cl. 264—99　　　　　　　　　　　　　　9 Claims

ABSTRACT OF THE DISCLOSURE

An elongated oval plug is forced into a tubular parison to contact and preferentially cool the portions of the parison which will undergo the greatest amount of stretching when the parison is expanded.

BACKGROUND OF THE INVENTION

This invention relates to improved methods for blow molding oriented hollow articles of irregular shape.

While patents in the blow molding art go back over one hundred years, it has only been in the last dozen years or so that blow molding of hollow plastic articles has achieved significant commercial success. Blow molding has traditionally been associated with the formation of bottles of a generally round configuration. In recent years, however, there have been efforts to expand the blow molding techniques to encompass the formation of more sophisticated moldings, including such diverse items as hollow beverage cases, having internal dividers, items having integrally molded handles, and the like. In conventional blow molding techniques, it is a fairly simple matter to compensate for the unsymmetrical configuration of the final product by means of programming the extrusion of the parison or by means of extruding a parison initially which has a variation in thickness around the circumference, for instance, by utilizing an extrusion die having a flattened bushing.

Recently, there has been developed techniques whereby blow molded articles can be produced having biaxial orientation, which articles have exceptional strength and other highly desirable physical properties. This technique involves forming a parison, cooling it to well below the crystalline melting point, and thereafter reheating it to orientation temperature which is just below the crystalline melting point. Such techniques are disclosed in Wiley, U.S. 3,288,317, and Turner et al., U.S. 3,390,426, for instance. The problems normally encountered in forming irregularly shaped blow molded articles are increased many fold when dealing with parisons at orientation temperature because the parison is already at a temperature just below its crystalline melting point at which temperature it is not easily expanded. Thus, when such a parison makes its initial contact with the mold walls, it is chilled yet further and this portion does not continue to expand. For this reason, all of the remainder of the expansion must take place in the portion of the parison which has not yet touched the mold wall, and this results in a great variation in wall thickness around the circumference of the article.

SUMMARY OF THE INVENTION

It is an object of this invention to provide irregularly shaped biaxially oriented articles having wall sections of improved uniformity; and It is a further object of this invention to provide an improved method for forming hollow articles from temperature conditioned parisons.

In accordance with this invention, a temperature conditioned parison at orientation temperature is stretched and thereafter contacted along the portion to be expanded toward the furthermost dimensions of the mold by an elongated oval plug.

BRIEF DESCRIPTION OF THE DRAWINGS

In the drawings, forming a part hereof, wherein like reference characters denote like parts in the various views.

DESCRIPTION OF THE PREFERRED EMBODIMENTS

Figure 1:
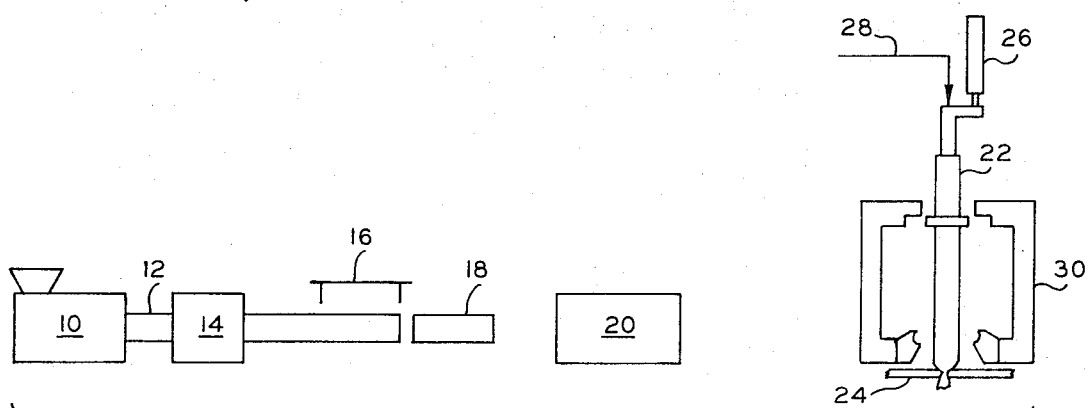
FIG. 1 is a schematic representation of a blow molding apparatus adapted to utilize the instant invention.

This invention is applicable for the formation of any irregularly shaped biaxially oriented blow molded article. Exemplary of such articles are oval shaped bottles and other containers, toys, lampshades, and the like.

The invention is applicable for the production of these articles from any orientable plastic resin. Preferred resins include crystalline polymers such as polymers of at least one mono-1-olefin having 2–8 carbon atoms per molecule, more preferably polymers and copolymers of ethylene, propylene, and 1-butene, with polypropylene being especially preferred.

The thermoplastic is first extruded or molded into parison preforms and cooled to solidify same. The parisons are then heated to orientation temperature which in the case of the olefin polymers, is generally about 1–50, preferably 5–25° F., below the crystalline melting temperature. The crystalline melt point can be determined by placing a small sample of the material to be tested on a heating stage of a polarizing microscope and recording the crystalline melting point as that temperature at which the last birefringence disappears on slow heating. The parison preforms can be heated to this orientation temperature in an air oven, in a liquid bath, in a heating block, or by subjecting them to radiant heat or any other suitable means.

The terms "unsymmetrical" or "irregular" as used herein to describe the shape of the articles being molded is meant to refer to articles which do not possess radial symmetry in the manner of a generally round bottle. This term is meant to encompass articles having a generally flat or oval configuration, and in particular, to encompass bottles such as are commonly made using conventional techniques wherein the upper portion is generally cylindrical and the lower portion oval.

The elongated oval plug is introduced into the interior of the parison after the same has been stretched at orientation temperature. When the parison is grasped at each end and stretched to effect an orientation in the longitudinal direction, it tends to neck down in the central portion thereof. The descending plug being oval shaped along at least a portion of the length thereof contacts the inner walls of the parison along the surface of the plug at the ends of the major axis thereof. These areas of contact correspond to the portions of the mold toward which the parison will be expanded a greater distance, that is, the portions of the mold at the ends of the major axis of the mold, in the case of an oval shaped mold. It is to be understood that the plug may have sections which are not oval such as a generally cylindrical or round tapered section at the upper portion thereof which expands the end of the parison held by the thread forming means out into more intimate contact with the thread forming means so as to give a better surface finish on the thread area. Generally, when biaxially oriented bottles are formed without the use of this invention, a ring of plastic is formed protruding inwardly adjacent the bottom portion of the thread area. This is highly undesirable since it can interfere with apparatus utilized in filling the container with a material to be packaged. In accordance with the invention, as the plug descends, this excess plastic is smoothed out. Also, some tends to accompany the plug as it descends, thus bringing additional material to the needed areas. It is also within the scope of the invention for the plug to descend momentarily prior to stretching the parison so that the cylindrical section of the plug can aid in forming the threads; thereafter, the plug is retracted, the parison stretched, and then the plug introduced into the stretched parison as described hereinabove. In any event, the final descent of the plug will always be into a parison which has been stretched longitudinally.

The stretched parison at the time the plug is introduced is at orientation temperature, which as noted before, is that temperature just below the crystalline melting point for polymers such as 1-olefins and the like. The purpose of the plug contacting this parison in the areas which are to be expanded to the greatest extent is not to chill the parison in the sense commonly conveyed by the word "chill." Rather, this parison which is in the solid state at a very carefully controlled temperature is cooled only a very slight amount so as to retard but not to eliminate stretching in this area. It is preferred that the average temperature of the parison in this area be reduced only about 1–5, preferably 2–3° F. Of course, there will be a temperature gradient created across the wall of the parison such that in the inner 5 mils or so of the parison adjacent the contact area, the temperature may be lowered 6–15, preferably 8–12° F.

Thus, the plug is preferably made of a low coefficient of friction-low thermal conductivity material, that is, a material having a lower heat conductivity and lower coefficient of friction than steel, for instance. A preferred material is linen cloth-based phenolics such as those sold under the trade name Synthane. Also suitable are Teflon, glazed porcelain, and ceramics. A metal plug can be used if the surface is such that it has a low coefficient of friction, particularly if it is provided within internal heating means to keep it at a high enough temperature that the polymer is cooled only a few degrees.

It is preferred to introduce the blowing fluid through holes in each side of the flat surface of the plug so as to form two bubbles which coalesce as the bottle is formed. In this way, the portion of the parison which is not in contact with the plug is first expanded out into contact with the mold walls across from the minor axis of the mold. Thereafter, the portion of the parison which has been cooled slightly by contact with the plug expands toward the furthermost portions of the mold, that is, toward those portions at the ends of the major axis of the mold. Slight additional cooling of the polymer in this area allows it to be stretched but causes sufficient resistance to stretching that some material is pulled from the portion of the parison which first contacted the mold walls so that the entire parison is drawn out to a relatively uniform wall thickness as it assumes final conformity with the configuration of the mold.

By controlling the amount of cooling effected by the plug for instance, by controlling the temperature of the plug or by utilizing a plug of the proper thermal conductivity, the expansion of the parison can be tailored so that for each individual shape of bottle, the wall thickness along the walls at the ends of the major and minor axes are exactly identical. It is even possible to provide for the wall thickness to be greater along the walls opposite the major axis by cooling the parison to a greater extent. This is one reason chilling in the usual sense of the word is to be avoided, as undue cooling of the portion of the parison to be expanded out against the walls at the ends of the major axis can result in as much as a 10-fold greater thickness in these walls than in the walls at the ends of the minor axis.

Preferably the material comprising the surface of the plug will have a static coefficient of friction against polypropylene of less than 0.1 and a thermal conductivity K value in B.t.u./(hr.)(ft.$^2$)(° F./in.) of less than 8, preferably less than 1.

Another unexpected benefit flowing from the use of the instant invention is that the pinching off of the bottom of the parison is facilitated. In view of the fact that if orientation is to be effected, the parison must be at orientation temperature which is well below the temperature at which the polymer is molten and generally considered to be moldable, it is very difficult to seal the end of the parison which is to form the bottom of the article. Yet as a practical matter, it is greatly to be preferred to utilize the open end parisons since they can be produced simply by extruding a continuous length of tubing and cutting it into individual work pieces. The most desirable solution would be simply to seal the parison by the action of the mold halves closing as is done in conventional blow molding. It has been found, surprisingly, that the action of the oval plug in flattening out the cross-sectional shape of the parison results in a superior seal being formed when the bottom is sealed and severed by means of the mold halves coming together.

Referring now to the drawings, particularly FIG. 1, there is shown in schematic representation an operation employing the instant invention comprising an extrusion means 10 for forming a tubular extrudate 12. Tubular extrudate 12 passes through vacuum sizing and quenching chamber 14 and thence to cutting mechanism 16 where it is severed into individual parison preforms 18. Individual parison preforms 18 are heated to orientation temperature in air oven 20. The thus heated parisons are grasped at a first end thereof by thread forming jaws 22 and at the second end thereof, by pinching fingers 24. Relative movement is effected between the two ends of the parison, for instance, by means of raising thread forming jaws 22 through the action of cylinder 26 and the elongated oval plug is introduced into the interior of the parison as will be shown in FIGS. 2–4. Fluid pressure is introduced into the interior of the parison by means of line 28 to expand it out into conformity with the mold cavity formed by mold halves 30.

Figure 2:
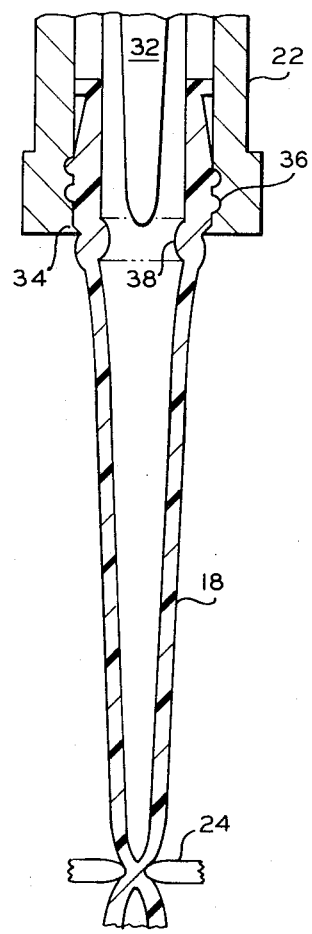
FIG. 2 is a detailed view of the thread-forming jaws and gripping means for the parison.
Figure 3:
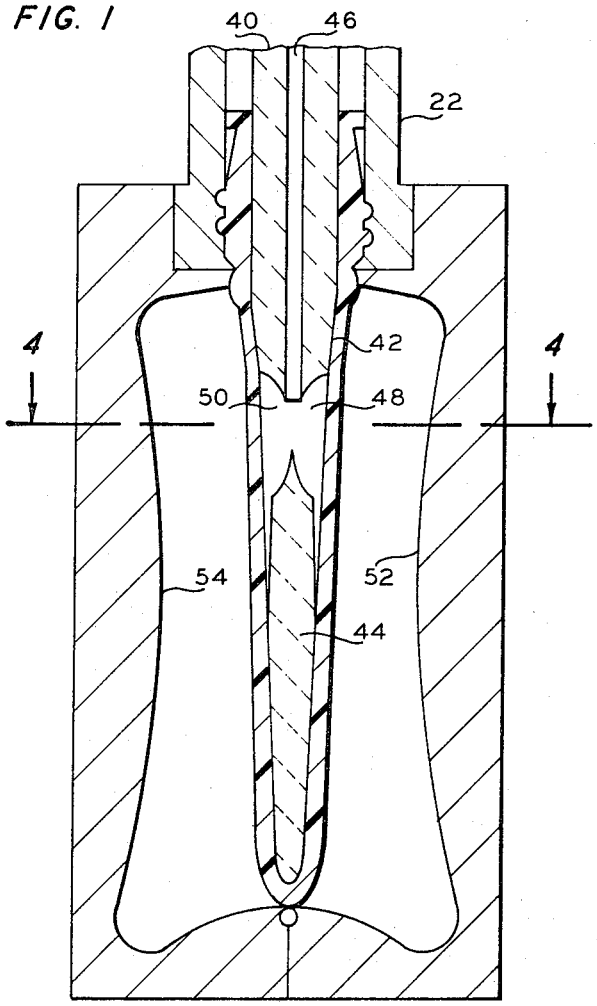
FIG. 3 is a cross-sectional view similar to FIG. 1 showing a later stage in the operation.
Figure 4:
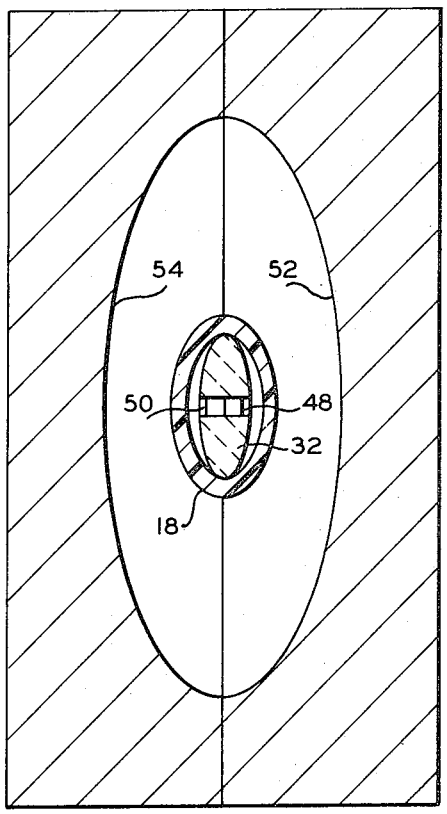
FIG. 4 is a cross-sectional view along section lines 4—4 of FIG. 3.

Referring now to FIG. 2, there is shown in detail thread-forming jaws 22 having centrally disposed therein elongated oval plug 32. Gripping jaw 22 has bite ring 34. In this way the parison can be gripped securely at the upper end thereof so as not to be pulled loose as relative movement is effected between member 22 and member 24 to stretch said parison longitudinally. As noted hereinabove, the plug 32 can be extended momentarily, prior to the time the parison is stretched, in order to force the polymer into conformity with thread-forming grooves 36 in jaws 22, although this is not essential. As referred to hereinabove, an annular ring projecting inwardly forms around the area adjacent the bottom of the thread-forming jaws, as shown by reference character 38. As can be seen from FIG. 3, the insertion of plug 32 smooths out this ring. As can be seen from FIG. 3, plug 32 has an upper cylindrical section 40, shoulder portion 42, and tapered oval section 44. In FIG. 3, plug 32 is shown in cross section taken perpendicular to the long or major axis of the plug. Fluid such as air is introduced into the interior of the parison by means of conduit 46 centrally disposed within plug 32, said conduit terminating in holes 48 and 50 on the flat sides of the tapered plug. Mold walls 52 and 54 thus represent the walls at the ends of the minor axis of the mold, as can be seen from FIG. 4.

By varying the degree of taper of the plug and the coefficient of friction thereof, varying amounts of plastic can be carried down with the plug to give extra material in the bottom portion of the parison; this is useful in molding bottles with a relatively small diameter upper section and a relatively large oval bottom section.

In the drawings, many conventional parts such as temperature controllers, heating elements, structural support members, and the like have been omitted for the sake of simplicity, but their inclusion is understood by those skilled in the art and is within the scope of the invention.

EXAMPLE

Propylene homopolymer having a density of 0.905 (ASTM D 1505–63T), a melt index of 2 (ASTM D 1238–62T), Condition L), and a crystalline melting point of about 340° F. was extruded into tubing having an external diameter of 0.850-inch and a wall thickness of 0.15-inch. This tubing was cooled to room temperature, cut into 5-inch lengths, and reheated to about 320° F. Such heated parisons were grasped at one end by a thread-forming jaw mechanism similar to that shown in the drawings, restrained at the other end, and stretched longitudinally to effect molecular orientation in the longitudinal direction. Immediately thereafter, a tapered elongated oval plug made of Synthane and having the exact configurations shown in the drawings was inserted into said stretched parison to substantially the complete length of the portion of the parison to be blown into finished article as shown in FIG. 3 of the drawings. Fluid pressure was introduced through holes in the flat sides of the plug to cause the parison to conform to the shape of the mold cavity, all of these steps occurring in sequence so that, while the apparatus was at ambient temperature, the parison remained at orientation temperature throughout the fabrication operation. The resulting 12-ounce bottle had a major axis near the base of 2¾ inches and a minor axis of 2⅛ inches. The wall thickness of the bottle along the ends of the major axis was 12 mils and the wall thickness of the bottle along the ends of the minor axis was 12 mils also.

An identical parison at the identical temperature was molded in the identical mold of the example hereinabove with the only difference being that an elongated plug was not introduced into the interior of the parison. The resulting bottle had a wall thickness at the ends of the minor axis of 14 mils and a wall thickness at the ends of the major axis of 10 mils.

While this invention has been described in detail for the purpose of illustration, it is not to be construed as limited thereby, but is intended to cover all changes and modifications within the spirit and scope thereof.

I claim:

1. A method of forming biaxially oriented hollow objects having an irregular configuration comprising:

longitudinally stretching an elongated tubular parison which parison is at orientation temperature;

introducing an elongated oval plug of low heat conductivity and being cooler than the temperature of said parison into said thus stretched parison to substantially the entire length of the portion of said parison to be expanded into said article, said plug having an exterior circumference of less than the circumference of the corresponding interior wall portion of said parison such that said plug preferentially contacts portions of said parison which are to be stretched the greatest distance and cools such portions within the range of from 1–5° F.;

thereafter creating a pressure differential to expand said parison out into conformity with a molding zone.

2. A method according to claim 1 wherein said parison comprises a polymer of at least one mono-1-olefin having 2–8 carbon atoms per molecule and said parison is heated to an orientation temperature of 1–50° F. below the crystalline melting point thereof.

3. A method according to claim 1 wherein said parison comprises polypropylene and said parison is heated to an orientation temperature of 1–50° F. below the crystalline melting point thereof.

4. A method according to claim 1 wherein said parison is expanded by means of the introduction of fluid pressure from the two flat sides of said oval plug so as to form two bubbles expanding toward the walls at the end of the minor axis of said molding zone.

5. A method according to claim 1 wherein said parison is gripped at a first end thereof by thread-forming jaws, grasped at the other end, stretched, and thereafter said plug introduced for the firsttime, said plug smoothing the inner surface of said parison around the area adjacent the level of the lowermost portion of said thread-forming jaws.

6. A method according to claim 1 wherein said parison is grasped at one end, said plug is lowered and retracted to form threads; and thereafter, said parison is stretched.

7. A method according to claim 1 wherein said parison is formed by continuous extrusion of a length of tubing which length is thereafter cooled to room temperature severed into individual work pieces, and reheated.

8. A method according to claim 1 wherein said plug has a thermal conductivity of K value of less than 8.

9. A method according to claim 1 wherein said plug is made of linen-based phenolic.

References Cited

UNITED STATES PATENTS

| 2,336,821 | 12/1943 | Wadman | 18—5 BH UX |
|---|---|---|---|
| 2,750,625 | 6/1956 | Colombo | 18—5 |
| 2,985,915 | 5/1961 | Winstead | 264—97 UX |
| 3,032,823 | 5/1962 | Sherman | 264—98 |
| 3,125,619 | 3/1964 | Miller | 264—98 |
| 3,137,748 | 6/1964 | Makowski | 264—97 |
| 3,191,225 | 6/1965 | Polka | 264—97 UX |
| 3,271,489 | 9/1966 | Fogelberg et al. | 264—98 X |
| 3,277,223 | 10/1966 | Curto | 264—97 |
| 3,364,520 | 1/1968 | Hestehave | 260— 97 X |
| 3,390,426 | 7/1968 | Turner | 18—5 |

OTHER REFERENCES

See also: In re Miller, 136 USPQ 205.

ROBERT F. WHITE, Primary Examiner

T. J. CARVIS, Assistant Examiner

U.S. Cl. X.R.

18—5; 264—94